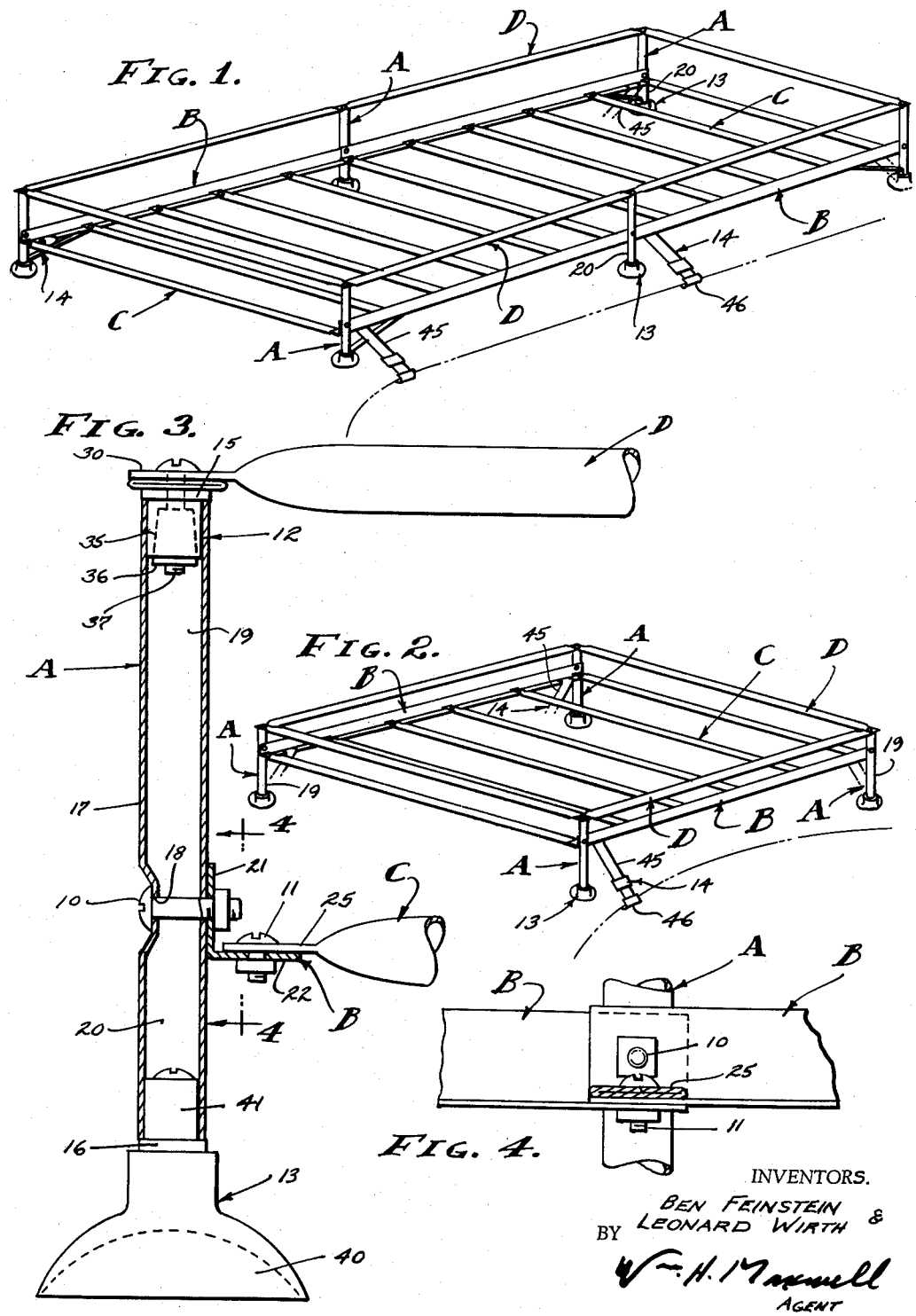

3,061,256
AUTO TOP CARRIER
Ben Feinstein, 4427 Don Felipe Drive, Los Angeles 8, Calif., and Leonard Wirth, 4854 Dempsey St., Encino, Calif.
Filed Mar. 21, 1960, Ser. No. 16,602
8 Claims. (Cl. 248—163)

This invention relates to a carrier for the top of an automobile and it is particularly concerned with a carrier that is versatile in its use and application, it being a general object of this invention to provide a carrier adapted to be employed in connection with a variety of styles and sizes of automobiles.

The tops of automobiles are used for the support of racks or carriers that are employed for carrying luggage of varied sorts. Said carriers are of characteristically frame-like construction made up of light weight construction commensurate with the strength required. The usual configuration is a flat horizontally disposed assembly, completely or partially erected, and which overlies the top of the automobile. In any case the assembly, or assemblies, involved is quite extensive in size in order to construct a carrier of appreciable size. Further, the usual ordinary carrier is not universally applicable to various automobiles, for example to small as well as large automobiles. In the case of a typical small vehicle the roof will have a high camber as indicated in FIG. 2 of the drawings, while in a typical large vehicle the roof will be substantially flat. Thus, it is not only size but it is also the roof contour that will require a variation in carrier configuration.

As a result of the very general problem outlined above carriers are ordinarily tailored to fit different types of automobiles. For example, when the automobile is small a small carrier is provided, and if the roof of said auto is of high camber then the legs of the carrier are extended. On the other hand, if the roof of said small auto is substantially flat then the carrier can have short legs. However, when the automobile is large a large carrier is provided and if the roof line is substantially straight and horizontal, as shown in FIG. 1 of the drawings, short legs are provided. Ordinarily, the length of legs establishes the clearance of the carrier above the crown of the vehicle roof.

An object of this invention is to provide a knock-down carrier or rack for the tops of automobiles and which is made up of a plurality of straight elongate elements. With the carrier that we provide the said straight elements are easily compacted, for accommodation in a minimum sized package, all for simplicity of manufacture, ease of handling and for economy of merchandising.

Another object of this invention is to provide a rack or carrier of the character referred to that can be converted in size, by simply using less or additional identical parts and elements. The carrier is not only adapted to be erected in a small or minimum configuration, but is also adapted to be erected in a large or maximum configuration and the same parts, in different number, are used in either case.

It is still another object of this invention to provide a carrier of the character referred to that can be converted in height by simply assembling the parts and elements in different predetermined ways. As disclosed, the legs that we provide are reversible and can be properly assembled with the long or short end down as shown and compared in FIGS. 1 and 2 of the drawings.

Further, it is an object of this invention to provide a rack or carrier of the character above referred to and which is easily assembled into a strong and reliable structure and with the use of simple hand tools, for example, with the aid of a pliers and a screwdriver, or the like.

The various objects and features of our invention will be fully understood from the following detailed description of the typical preferred form and application thereof, throughout which description reference is made to the accompanying drawings, in which:

FIG. 1 of the drawings is a perspective view of the carrier that we provide and showing it in its augmented condition. FIG. 2 is a view similar to FIG. 1 and shows said carrier in its diminished condition. FIG. 3 is an enlarged detailed sectional view of a portion of the structure and taken, generally, through one of the legs thereof, and, FIG. 4 is a fragmentary view taken as indicated by line 4—4 on FIG. 3.

The rack or carrier is for use on automotive vehicles and as stated above it is a convertible carrier adapted to use under various conditions. In FIG. 1 of the drawings we have shown the rack as it appears when assembled for use on a large flat automobile top, while in FIG. 2 we have shown the rack as it appears when assembled for use on a small automobile top. In either case, the same parts and elements are involved and the leg elements can be reversed as required. For all intents and purposes there are but four main or basic elements involved in the carrier structure and these are, in general, the legs A, the side rails B, the slats C and the top rails D. In addition to these said main elements there are fasteners 10 securing the side rails B to the legs A, fasteners 11 securing the slats C to the side rails B, anchor means 12 securing the top rails D to the legs A, pads 13 at the legs A and engaging the vehicle roof, and mounting means 14 for connection to the vehicle roof.

The elements A through D are simple, straight parts and the remaining parts 10 through 14 are either relatively small or flexible, all in order that a full complement of elements and parts are readily accommodated in a minimum sized container or package (not shown). Thus, economy of merchandising is accomplished so that additional benefit can be passed on to the consumer of the instant product. Further, the four main elements of the structure are few in number, they are easily identified, and the fastening devices used are standard so that assembly of a carrier is no problem.

The legs A are like or identical elongate elements provided for support of the carrier and each is preferably made of tubular material, open at its opposite terminal ends. The said ends of the tube are normal as shown at 15 and 16, and the wall 17 is cylindrical. Intermediate the ends of the leg a transverse opening 18 is provided therethrough in order to carry the side rails B. A feature of the invention is the placement of said opening 18 which is located closer to the end 16 than to the end 15 and so that the leg A has long and short portions 19 and 20, respectively. By comparing FIGS. 1 and 2 of the drawings, it will be seen that said legs A are reversely employed as circumstances require in order to raise or lower the height of the carrier.

The side rails B are like or identical elongate elements provided for support of the slats C and they are adapted to be joined to the legs A at the openings 18. The rails are preferably made of angular cross section, to have a vertical leg 21 and a horizontal leg 22. As is shown, fasteners 10 extend through the openings 18 and through the end portions of the rails B, in which case the said end portions of the vertical leg 21 are perforated with corresponding openings. Further, the horizontal leg 22 is perforated with openings at suitable intervals, for example at six openings, to receive the fasteners 11 in connection with slats C. Thus, the side rail B is a simple straight element simply provided with fastener receiving openings.

The slats C are like or identical elongate elements provided for supporting engagement with the luggage to be carried and each is preferably made of straight tubular material, flattened at its opposite end portions 25. As shown, the portions 25 are coplanar and each has an opening to pass a fastener 11 (see FIG. 3).

The top rails D are like or identical elongate elements provided for tying the structure together into a rigid assembly, and for the usual tie-down facility in securing luggage to the carrier. Each rail D is preferably made of straight tubular material, flattened at its opposite end portions 30. As shown, the portions 30 are coplanar and each has an opening to pass a fastener from a part of the anchor means 12, later described. The slats C and rails D are preferably and essentially alike, but the latter rails are somewhat longer than the slats in order to reach the corners of the structure, as clearly indicated in FIG. 3.

In its simplest form, the carrier is assembled as shown in FIG. 2 to form a square plan configuration. This assembly is suitable for small automobiles and for automobiles having small or limited roofs. In the case illustrated, the long portions 19 of the legs are extended downwardly in order to raise the slats C above the crown of the verhicle roof. The side rails B are two in number, one at each side of the carrier and with a fastener 10 at each end of each rail and secured to the four legs A, as shown. The slats C are then arranged parallel with each other, six in number, to extend between the rails and secured with a fastener 11 at each end thereof. The carrier frame is now completed by inserting the anchor means 12 into the topmost open ends of the legs A, said means comprising a sleeve 35 that is expanded by a wedge 36 operated by a screw fastener 37. In practice, the four rails D are related end to end, forming a square, and the fasteners 37 passed through the openings in the ends thereof, after which the sleeves 35 and wedges 36 are assembled onto the fasteners. The top rail assembly is then put into place on the legs A by inserting the sleeves 35 into the open ends of the legs, after which the fasteners 37 are operated to move the wedges 36 to expand the sleeves 35.

With the framework of the carrier completed, as above set forth, the pads 13 are positioned on the legs A, one at each leg. As shown, the pads 13 comprise a pliant cup 40 of resilient material, such as rubber or the like, and the cup 40 has a projection 41 adapted to press into the open lowermost end of the leg A. Further, the supporting means 14 is provided and is preferably in the form of straps 45 secured to the side rails B and depending therefrom to hooks 46 engaged with the margins of the vehicle roof, as clearly indicated.

In its augmented form, the carrier is assembled as shown in FIG. 1 to form a rectangular plan configuration. Thus assembly is suitable for larger roofs and involves the use of additional elements and parts that are identical to those hereinabove described. In effect, one end of the simple form of carrier (FIG. 2) is removed simply by removal of one top rail D. In actual practice, the said one top rail D is merely loosened or released at one end and swung to extend axially from the adjoining top rail D at its other end. In the case now under consideration, an additional pair of side rails B are secured to the legs A by fasteners 10 and an additional pair of legs A are secured to the extreme ends of said additional rails. Additional slats C are then engaged parallel with each other, five in number, to extend between the rails and are secured with fasteners 11 at the ends thereof. The carrier frame is now completed by the addition of a pair of rails D, secured to the additional legs A all as above described. Further, the mounting means 14 and pads 13 are employed as hereinabove set forth and to the end that a rigid elongate or rectangular carrier is constructed.

From the foregoing it will be apparent that we have provided a very simple and practical carrier that can be converted to meet various situations and installation requirements. Further, it will be apparent that the elements and parts thereof are economically packaged and handled and that they are easily identified and can be assembled with facility.

Having described our invention, we do not wish to be limited or restricted to the specific details herein set forth, but wish to reserve to ourselves any variations or modifications that may appear to those skilled in the art and fall within the scope of the following claims:

Having described our invention, we claim:

1. A knock-down auto top carrier of the character described and adapted to be varied in configuration and including, vertically disposed legs, side rails extending between the legs, slats extending between the side rails, and top rails anchored to the legs, said legs being perforated nearer one end than the other to receive the side rails whereby the said legs are reversible to vary the height of the carrier.

2. A knock-down auto top carrier of the character described and adapted to be varied in configuration and including, vertically disposed tubular legs, side rails extending between the legs, slats extending between the side rails, and top rails anchored to the legs by expanding means inserted into the ends of the legs, said legs being perforated nearer one end than the other to receive the side rails whereby the said legs are reversible to vary the height of the carrier.

3. A knock-down auto top carrier of the character described and adapted to be varied in configuration and including, identical vertically disposed legs, identical side rails extending between the legs, identical slats extending between the side rails, and identical top rails anchored to the legs, said legs being perforated nearer one end than the other to receive the side rails whereby the said legs are reversible to vary the height of the carrier.

4. A knock-down auto top carrier of the character described and adapted to be varied in configuration and including, identical vertically disposed tubular legs, identical side rails extending between the legs, identical slats extending between the side rails, and identical top rails anchored to the legs by expanding means inserted into the ends of the legs, said legs being perforated nearer one end than the other to receive the side rails whereby the said legs are reversible to vary the height of the carrier.

5. A knock-down auto top carrier of the character described and adapted to be varied in configuration and including, identical vertically disposed legs, identical side rails extending between the legs, identical slats extending between the side rails, and identical top rails anchored to the legs, said legs being perforated nearer one end than the other to receive the side rails whereby the said legs are reversible to vary the height of the carrier, and said side and top rails being adapted for arrangement in end to end relationship whereby the size of the carrier is extended.

6. A knock-down auto top carrier of the character described and adapted to be varied in configuration and including, identical vertically disposed tubular legs, identical side rails extending between the legs, identical slats extending between the side rails, and identical top rails anchored to the legs by expanding means inserted into the ends of the legs, said legs being perforated nearer one end than the other to receive the side rails whereby the said legs are reversible to vary the height of the carrier, and said side and top rails being adapted for arrangement in end to end relationship whereby the size of the carrier is extended.

7. A knock-down auto top carrier of the character described and adapted to be varied in configuration and including, identical vertically disposed legs, identical side rails extending between the legs, identical slats extending between the side rails, and identical top rails anchored to the legs, said legs being perforated nearer one end than the other to receive the side rails whereby the said legs are reversible to vary the height of the carrier, and said side and top rails being adapted for arrangement in end to end relationship with a leg at the point of joinder therebetween and whereby the size of the carrier is extended.

8. A knock-down auto top carrier of the character described and adapted to be varied in configuration and including identical vertically disposed tubular legs, identical side rails extending between the legs, identical slats extending between the side rails, and identical top rails anchored to the legs by expanding means inserted into the ends of the legs, said legs being perforated nearer one end than the other to receive the side rails whereby the said legs are reversible to vary the height of the carrier, and said side and top rails being adapted for arrangement in end to end relationship with a leg at the point of joinder therebetween and whereby the size of the carrier is extended.

References Cited in the file of this patent

UNITED STATES PATENTS

| | | |
|---|---|---|
| 1,748,282 | Ellis | Feb. 24, 1930 |

FOREIGN PATENTS

| | | |
|---|---|---|
| 1,158,913 | France | Feb. 3, 1958 |
| 743,226 | Great Britain | Jan. 11, 1956 |